(12) United States Patent
Roshan et al.

(10) Patent No.: US 11,403,717 B2
(45) Date of Patent: Aug. 2, 2022

(54) EXPLAINABLE RULE-BASED CALCULATIONS

(71) Applicant: INTUIT INC., Mountain View, CA (US)

(72) Inventors: Shashi Roshan, Champaign, IL (US); Aminish Sharma, Bangalore (IN); Manish Shah, Bangalore (IN); Anoop Makwana, Bangalore (IN); Gang Wang, San Diego, CA (US)

(73) Assignee: INTUIT, INC., Mountain View, CA (US)

( * ) Notice: Subject to any disclaimer, the term of this patent is extended or adjusted under 35 U.S.C. 154(b) by 411 days.

(21) Appl. No.: 16/671,890

(22) Filed: Nov. 1, 2019

(65) Prior Publication Data

US 2021/0133893 A1 May 6, 2021

(51) Int. Cl.
*G06Q 40/00* (2012.01)
*G06N 5/04* (2006.01)

(52) U.S. Cl.
CPC ........... *G06Q 40/125* (2013.12); *G06N 5/045* (2013.01); *G06N 5/046* (2013.01); *G06Q 40/123* (2013.12)

(58) Field of Classification Search
CPC .... G06Q 40/125; G06Q 40/123; G06N 5/045; G06N 5/046
USPC .......................................................... 705/32
See application file for complete search history.

(56) References Cited

U.S. PATENT DOCUMENTS

| 10,169,826 | B1* | 1/2019 | Wang ................... G06Q 40/123 |
| 2009/0234791 | A1 | 9/2009 | Delmonico et al. |
| 2018/0114275 | A1 | 4/2018 | Wang et al. |

OTHER PUBLICATIONS https://ttlc.intuit.com/community/taxes/discussion/how-do-i-display-the-tax-computation-worksheet/00/759151.*
International Search Report/Written Opinion issued to PCT/US2020/033925 dated Jul. 30, 2020.

* cited by examiner

*Primary Examiner* — Russell S Glass
(74) *Attorney, Agent, or Firm* — Patterson & Sheridan, LLP

(57) ABSTRACT

Aspects of the present disclosure provide techniques for explainable payroll calculations. Embodiments include receiving a request from a client for a rule-based calculation. Embodiments include receiving one or more user values related to the request. Embodiments include using a calculation graph to determine the rule-based calculation based on the one or more user values. The calculation graph may comprise at least one node that performs an operation using the one or more user values. Embodiments include identifying an explanation template associated with the at least one node. Embodiments include generating an explanation of the rule-based calculation based on the explanation template and the one or more user values. Embodiments include providing the rule-based calculation and the explanation of the rule-based calculation to the client in response to the request.

20 Claims, 5 Drawing Sheets

300

Employee Payslip

John Smith

Pay Period: 18 Apr – 17 May          Net Pay: $200.25

Earnings
Salary                                $400.50
Gross Pay                             $400.50
Deductions
PAYE                                  $200.25
Total                                 $200.25

Explanation
Why is my PAYE tax $200.25?

Your $200.25 tax deduction for the current period comes from applying a $200.25 regulatory limit to your $215.00 current tax due.

FIG. 3

EXPLAINABLE RULE-BASED CALCULATIONS

INTRODUCTION

Aspects of the present disclosure relate to using knowledge graphs and explanation templates to dynamically generate explanations of rule-based calculations performed using the knowledge graphs.

BACKGROUND

Applications often perform calculations by applying known formulas to user data. For example, a financial service application may apply tax formulas to user income and tax values. However, the user is generally only presented with an end result of the calculation, and the processes for determining certain the result may be obfuscated and therefore difficult to comprehend for a user. For example, it may not be clear to a user how tax laws and regulations affect the outcome of a tax calculation, or how a certain value was determined based on the user's data. This lack of meaningful explanations can lead to reduced understanding by users, which can cause abandonment of an application.

Accordingly, there is a need in the art for improved techniques for providing explainable rule-based calculations in financial services applications.

BRIEF SUMMARY

Certain embodiments provide a method. The method generally includes: receiving a request from a client for a rule-based calculation; receiving one or more user values related to the request; using a calculation graph to determine the rule-based calculation based on the one or more user values, wherein the calculation graph comprises at least one node that performs an operation using the one or more user values; identifying an explanation template associated with the at least one node; generating an explanation of the rule-based calculation based on the explanation template and the one or more user values; and providing the rule-based calculation and the explanation of the rule-based calculation to the client in response to the request.

Other embodiments provide a non-transitory computer-readable medium comprising instructions that, when executed by one or more processors of a computer system, cause the computer system to perform a method. The method generally includes: receiving a request from a client for a rule-based calculation; receiving one or more user values related to the request; using a calculation graph to determine the rule-based calculation based on the one or more user values, wherein the calculation graph comprises at least one node that performs an operation using the one or more user values; identifying an explanation template associated with the at least one node; generating an explanation of the rule-based calculation based on the explanation template and the one or more user values; and providing the rule-based calculation and the explanation of the rule-based calculation to the client in response to the request.

Other embodiments provide a system comprising one or more processors and a non-transitory computer-readable medium comprising instructions that, when executed by the one or more processors, cause the system to perform a method. The method generally includes: receiving a request from a client for a rule-based calculation; receiving one or more user values related to the request; using a calculation graph to determine the rule-based calculation based on the one or more user values, wherein the calculation graph comprises at least one node that performs an operation using the one or more user values; identifying an explanation template associated with the at least one node; generating an explanation of the rule-based calculation based on the explanation template and the one or more user values; and providing the rule-based calculation and the explanation of the rule-based calculation to the client in response to the request.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 3 depicts an example user interface of an application related to explainable rule-based calculations.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
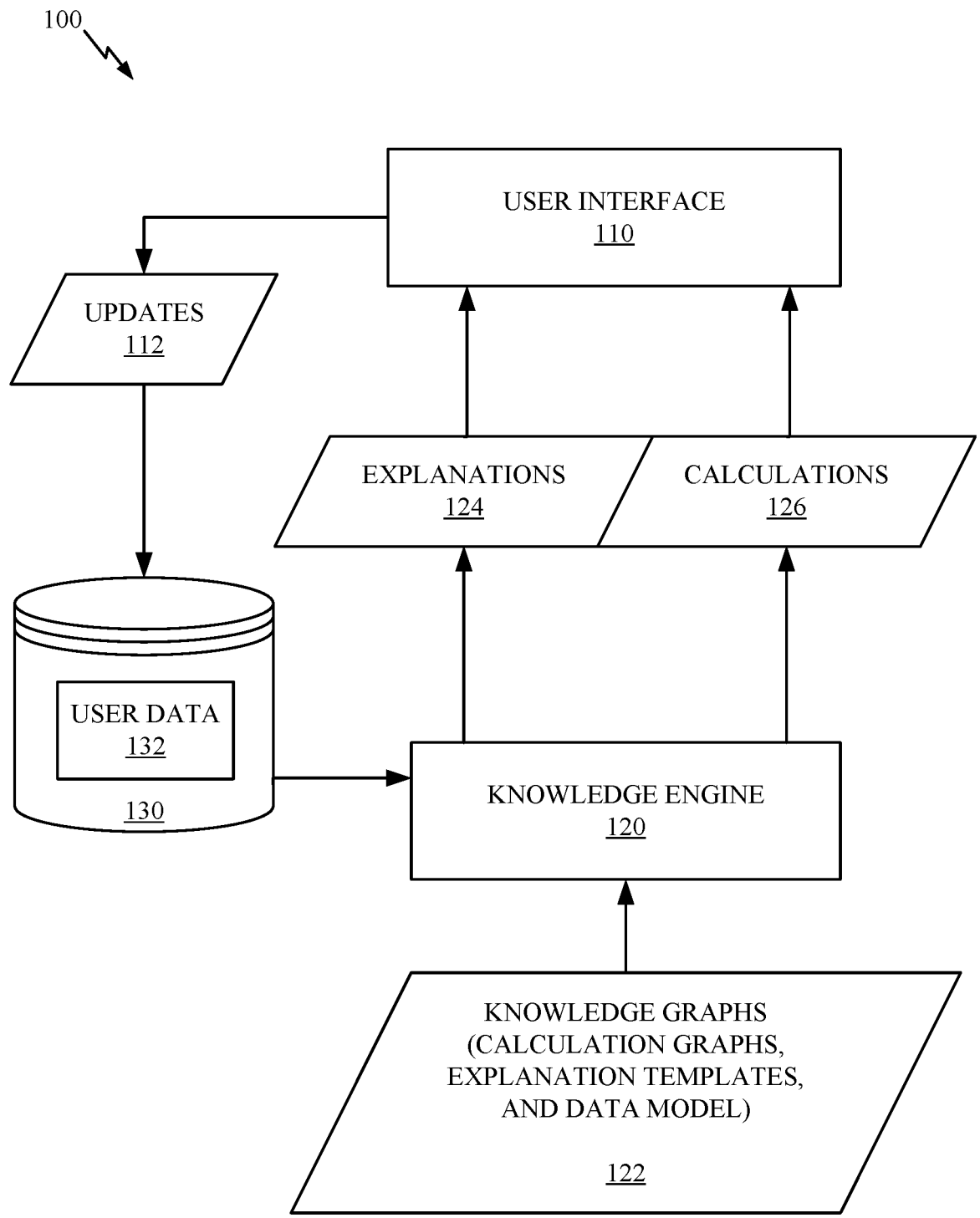
FIG. 1 depicts an example of explainable rule-based calculations.

Aspects of the present disclosure provide apparatuses, methods, processing systems, and computer readable mediums for dynamically generated explanations of rule-based calculations.

Financial services applications, such as payroll and accounting software applications, generally perform various calculations in order to provide users with end results, such as a paycheck value or an account balance. For example, an application may calculate various values related to an individual's income for payroll purposes, such as tax withholding amounts, retirement account contributions, net pay, and the like. However, it is generally not clear to the user of the application how certain calculations were performed or why certain results were reached.

Accordingly, embodiments of the present disclosure use calculation graphs and associated explanation templates to dynamically generate explanations of calculations that are tailored for the specific details of a given calculation for an individual for whom the calculations are performed. In one example, a knowledge engine uses calculation graphs to calculate a value based on various user data values. A calculation graph generally includes a plurality of nodes, each node comprising a particular operation that is performed on a set of input variables, and the outputs of some nodes may be inputs to other nodes. The explanation templates generally include user-friendly explanations of the operations that are personalized based on the input variables and the particular nodes used in the calculations.

For example, a calculation graph may include a node that performs a percentage calculation based on a user value and a regulatory limit to determine a cap on an amount of taxable income that can be withheld from a user's paycheck. The regulatory limit may be determined based on a governmental regulation and the user value may be determined based on the amount of taxable income earned by the user. In one example, an explanation template associated with the calculation graph includes a description of a percentage calculation performed by a node in user-friendly language, including variables that are populated based on the regulatory limit and the user's taxable income. Other examples include determining a retirement plan contribution amount based on an employee-selected percentage and/or an employer-provided limit and determining a social security tax withholding amount based on a governmental rate and/or income cap.

The explanation template may include different language for each node in the calculation graph, and an explanation for a given calculation is dynamically generated based on which nodes were used in the calculation. In one example, an explanation template includes content such as "Your withholding amount of [withholding value] was determined by applying a [regulatory limit value] regulatory limit to [taxable income value] of taxable income," where the portions in brackets are variables that are dynamically populated based on the values used in the calculation and the rest of the content comprises static language.

Embodiments of the present disclosure improve the technical field of rule-based calculations in software applications by dynamically generating explanations for calculations performed for particular users based on underlying calculation graphs. By using explanation templates to dynamically generate explanations based on which nodes in a calculation graph were utilized and based on particular values used in the calculations, techniques described herein allow targeted and specific explanations to be generated and provided to users, rather than simply providing generic or high-level explanations of calculations.

Example of Explainable Rule Based Calculations

FIG. 1 illustrates an example of a system 100 for generating explainable rule-based calculations. FIG. 1 is described in conjunction with FIG. 2, which depicts an example calculation graph, and FIG. 3, which depicts an example user interface.

System 100 includes a user interface 110 through which a user interacts with an application that performs rule-based calculations. For example, the application may be a financial services application. System 100 further includes knowledge engine 120, which may interface with or be a part of the application, and generally performs rule-based calculations and generates explanations based on the rule-based calculations. To perform calculations, knowledge engine 120 uses knowledge graphs 122, which in this example include calculation graphs, explanation templates, and a data model. A calculation graph generally includes a plurality of nodes that perform operations based on input variables in order to perform a calculation. For example, knowledge graphs 122 may include calculation graph 200 of FIG. 2.

Figure 2:
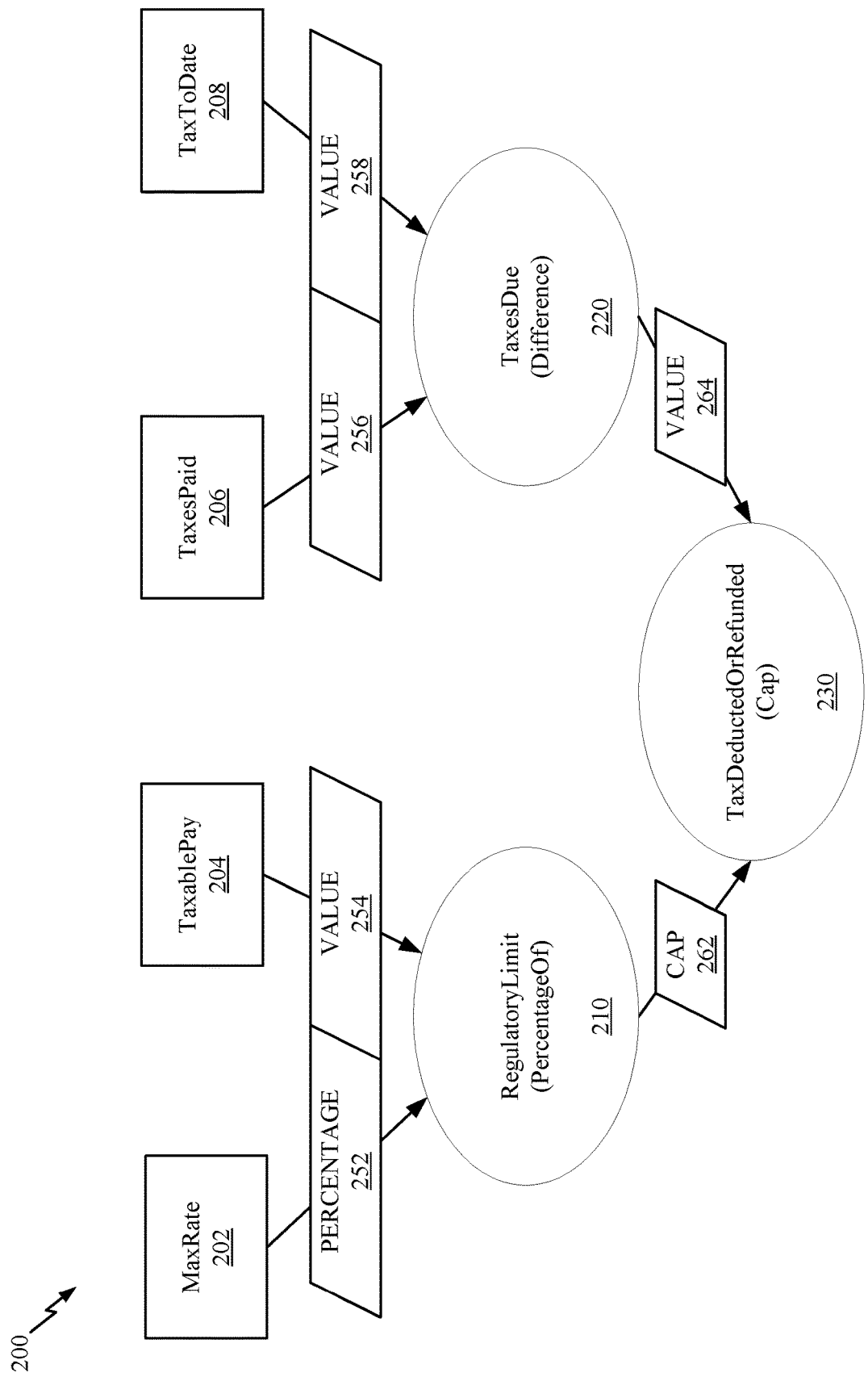
FIG. 2 depicts an example knowledge graph related to explainable rule-based calculations.

In FIG. 2, calculation graph 200 includes node 210, which performs a percentage calculation based on two input variables, "maxrate" 202, which is a percentage 252, and "taxablepay" 204, which is a value 254. Calculation graph 200 further includes node 220, which performs a difference calculation based on two input variables, "taxespaid" 206, which is a value 256, and "taxtodate" 208, which is a value 258. Calculation graph 200 further includes node 230, which performs a cap calculation (e.g., applying a cap to a value to determine how much of the value should be deducted) based on the output of node 210, which is a cap 262, and node 220, which is a value 264 indicating an amount of taxes due.

Calculation graphs are generally associated with a data model that defines the inputs and constants used by the nodes in the calculation graphs. For example, a data model may define maxrate 202 and taxablepay 204 as inputs to node 210 in calculation graph 200 (e.g., the data model defines the structure of the calculation graph).

Returning to FIG. 1, the explanation templates in knowledge graphs 122 generally include user-friendly descriptions of the operations performed by the nodes in the calculation graphs, including variables corresponding to the inputs to the nodes that are used in the calculations. For example, an explanation template associated with calculation graph 200 may include descriptions of the operations performed by each of nodes 210, 220, and 230, including variables for the inputs to each node.

Knowledge engine 120 also uses user data 132 in data store 130 to perform calculations. In an example, user data 132 is populated based on data input by users to user interface 110 and provided as updates 112 to data store 130. Data store 130 generally represents a data storage entity such as a database or repository, and may be located locally or remotely from knowledge engine 120.

Knowledge engine 120 may generate calculations 126 based on user data 132 and the calculation graphs of knowledge graphs 122, and knowledge engine 120 may also generate explanations 124 based on the explanation templates and calculation graphs of knowledge graphs 122 and user data 132.

In one example, knowledge engine 120 receives a request for a rule-based calculation and an explanation from user interface 110. In some examples, a user requests the calculation and the explanation is automatically requested along with the calculation. In certain embodiments, the user provides input, such as in the form of user preferences, indicating whether or not explanations are requested. The request may, for example, be issued as an application programming interface (API) call to knowledge engine 120. Knowledge engine 120 uses knowledge graphs 122, including calculation graph 200 in this example, as well as user data 132 to perform the calculation. With respect to FIG. 2, taxablepay 204, taxespaid 206, and taxtodate 208 are retrieved from user data 132 as values 254, 256, and 258, and maxrate 202 is determined based on the data model of knowledge graphs 122 as percentage 252. For example, maxrate 202 may be a regulatory limit entered into the data model by a developer or populated from a separate source, such as a governmental database or website.

At node 210, a percentage calculation is performed by applying percentage 252 to value 254 to determine the regulatory limit (cap 262) on how much of the user's income can be deducted. At node 220, a difference calculation is performed by calculating the difference between values 256 and 258 to determine the amount of taxes due (value 264). The cap 262 output by node 210 and value 264 output by node 220 are then provided as inputs to node 230, where a cap calculation is performed to determine the amount of tax deducted. In particular, cap 262 (the regulatory max amount of the user's taxable pay that can be deducted) is applied to value 264 (the amount of tax due) to determine the amount of tax to deduct. The output of node 230 is provided to user interface as a calculation 126.

Returning to FIG. 1, knowledge engine 120 generates an explanation 124 based on the nodes that were used to determine the calculation 126, which in this example includes nodes 210, 220, and 230, and the inputs used for the calculations.

FIG. 3 depicts an example user interface 300, which may correspond to user interface 110, in which an explanation is provided for a calculation.

User interface 300 includes an employee payslip or paystub for an employee named "John Smith" for a pay period ranging from 18 April to 17 May. During this pay period, John Smith earned a salary of $400.50, resulting in $400.50 of gross pay. Deductions for the pay period include a pay as you earn (PAYE) tax of $200.25, resulting a in a total deduction of $200.25. As such, John Smith's net pay is $200.25 (e.g., gross pay minus total deductions).

It may not be clear to the user based on these values why John Smith's PAYE tax is $200.25. As such, an explanation is provided for the PAYE calculation. For example, the PAYE tax deduction may have been calculated using calculation graph 200, with the PAYE tax amount of $200.25 being the output of node 230. As such, an explanation template associated with calculation graph 200 includes the text "Your [deduction amount] tax deduction for the current period comes from applying a [regulatory limit amount] regulatory limit to your [current tax due amount] current tax due." The variable [deduction amount] is populated in the explanation with $200.25 (e.g., the output of node 230), the [regulatory limit amount] variable is populated in the explanation with $200.25 (e.g., the cap 262 output by node 210), and the [current tax due amount] variable is populated in the explanation with $215.00 (e.g., the value 264 output by node 220). In some embodiments, the explanation is requested by user interface 300 in response to input from the user, such as if the user clicks on "Why is my PAYE tax $200.25?"

It is noted that the explanation may include more detailed information as well, such as how the regulatory limit amount was determined (e.g., including variables populated by percentage 252 and value 254) and how the current tax due was calculated (e.g., including variables populated by value 256 and value 258).

Deductions from taxable income are only included as one example of a calculation with which embodiments of the present disclosure may be implemented, and techniques described herein may be used to dynamically generate explanations for many different types of calculations.

Example Operations for Explainable Rule-Based Calculations

Figure 4:
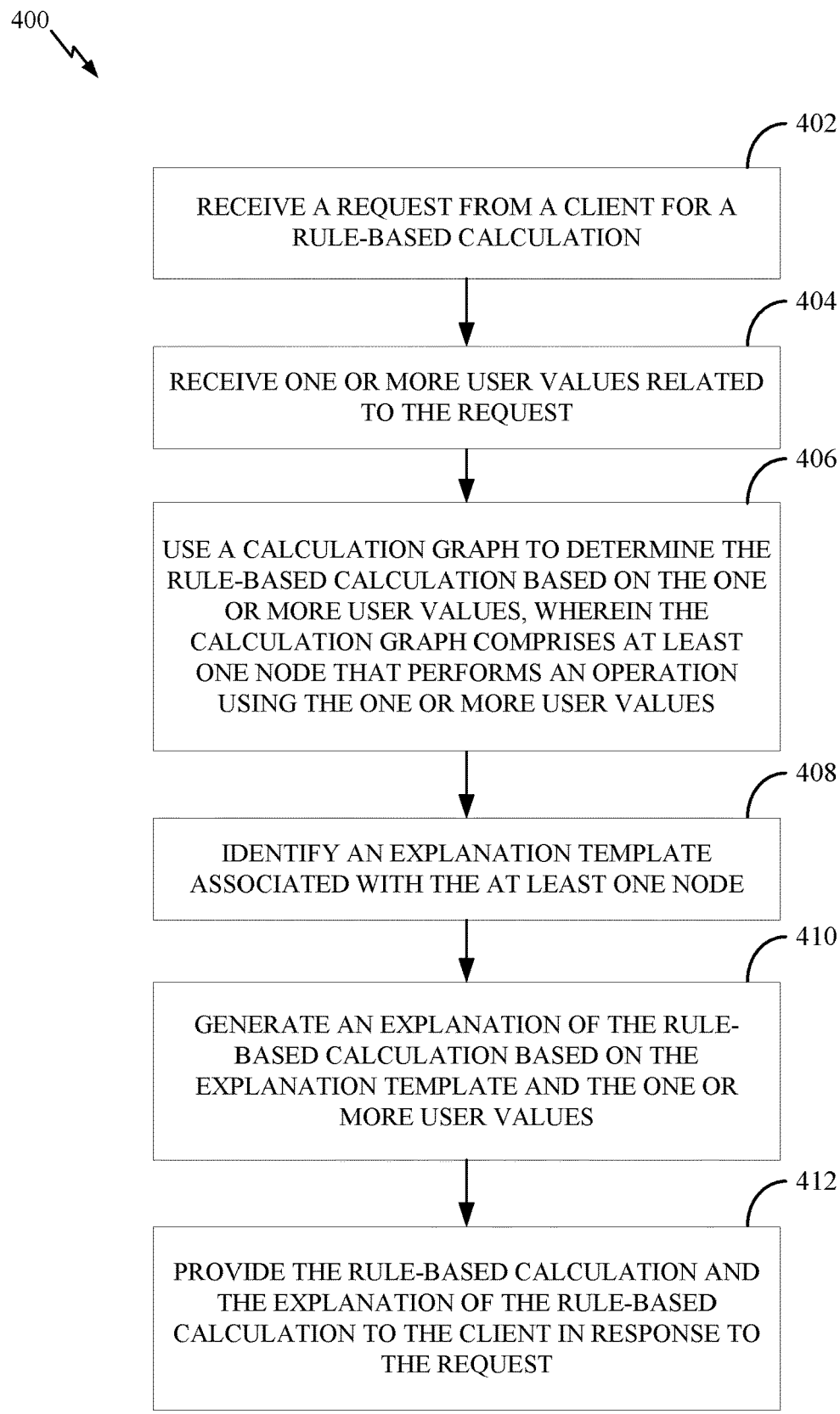
FIG. 4 depicts example operations related to explainable rule-based calculations.

FIG. 4 depicts example operations 400 for explainable rule-based calculations. For example, operations 400 may be performed by knowledge engine 120 of FIG. 1.

At step 402, a request is received from a client for a rule-based calculation. In an example, a user of user interface 110 of FIG. 1 (e.g., which may run on a client device) accesses a page of an application to view payroll information for a particular employee, and user interface 110 sends the request (e.g., an API call) to knowledge engine 120 of FIG. 1 to retrieve a rule-based calculation and an explanation of the calculation to display within user interface 110. In some embodiments, the explanation is automatically requested by the client along with the calculation. In other embodiments, a user specifies whether the explanation should be requested by the client, such as via user preferences or by selecting a user interface element.

At step 404, one or more values related to the request are received. In an example, knowledge engine 120 of FIG. 1 retrieves the one or more user values from user data 132 in data store 130 of FIG. 1. The one or more user values may include, for example, gross pay, taxable pay, taxes paid, taxes owed, filing status, and/or other information related to a particular employee. In some embodiments, one or more constants are also retrieved from a data model, such as regulatory values, for use in the rule-based calculation.

At step 406, a calculation graph is used to determine the rule-based calculation based on the one or more user values, wherein the calculation graph comprises at least one node that performs an operation using the one or more user values. In an example, knowledge engine 120 of FIG. 1 uses a calculation graph of knowledge graphs 122 of FIG. 1, inputs for which are defined in a data model of knowledge graphs 122 of FIG. 1, to perform the rule-based calculation. In one embodiment, the calculation graph is calculation graph 200 of FIG. 2, and includes nodes 210, 220, and 230, which perform percentage, difference, and cap calculations, respectively, based on the one or more user values. In certain embodiments, the operations also involve one or more additional values, such as legal or regulatory values (e.g., maxrate 202 of FIG. 2), that are determined based on the data model and/or a separate source, such as a governmental database or website. In some embodiments, an output of one node is provided as an input to another node of the calculation graph when performing the rule-based calculation.

At step 408, an explanation template associated with the at least one node is identified. For example, knowledge engine 120 of FIG. 1 may identify an explanation template of knowledge graphs 122 that is associated with one or more of nodes 210, 220, and 230 of FIG. 2 that are used in the rule-based calculation.

At step 410, an explanation of the rule-based calculation is generated based on the explanation template and the one or more user values. In an example, knowledge engine 120 of FIG. 1 uses an explanation template from knowledge graphs 122 of FIG. 1 to generate the explanation, populating variables in the explanation template based on the one or more user values. In certain embodiments, the explanation is further based on which nodes of the calculation graph were used in the rule-based calculation.

At step 412, the rule-based calculation and the explanation of the rule-based calculation are provided to the client in response to the request. In an example, knowledge engine 120 of FIG. 1 provides the explanation 124 and calculation 126 of FIG. 1 to user interface 110 of FIG. 1. In one embodiment, the user interface displays the rule-based calculation and the explanation of the rule-based calculation, as illustrated in user interface 300 of FIG. 3. In some embodiments, the client allows the user to request additional explanations for different rule-based calculations or different aspects of the rule-based calculation.

Example Computing Systems

Figure 5A:
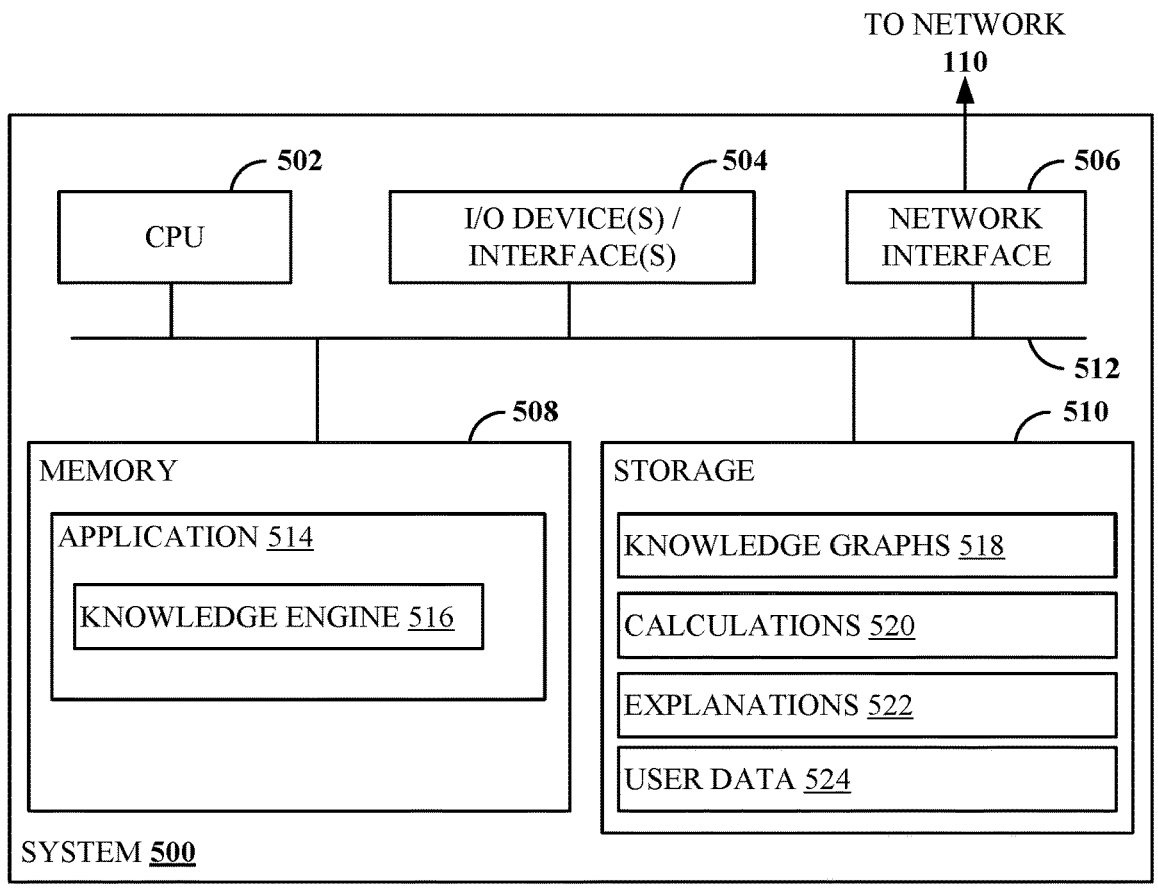
FIGS. 5A and 5B depict example processing systems for explainable rule-based calculations.

FIG. 5A illustrates an example system 500 with which embodiments of the present disclosure may be implemented. For example, system 500 may be representative of a server on which a financial services application, including knowledge engine 120 of FIG. 1, runs.

System 500 includes a central processing unit (CPU) 502, one or more I/O device interfaces 504 that may allow for the connection of various I/O devices 514 (e.g., keyboards, displays, mouse devices, pen input, etc.) to the system 500, network interface 506, a memory 508, storage 510, and an interconnect 512. It is contemplated that one or more components of system 500 may be located remotely and accessed via a network. It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. CPU 502 is included to be representative of a single CPU, multiple CPUs, a single CPU having multiple processing cores, and other arrangements.

Additionally, the memory 508 is included to be representative of a random access memory. As shown, memory 508 includes application 514, which may be a financial services application, such as an accounting and/or payroll application. Application 514 includes knowledge engine 516, which is generally representative of knowledge engine 120 of FIG. 1.

Storage 510 may be a disk drive, solid state drive, or a collection of storage devices distributed across multiple storage systems. Although shown as a single unit, the storage 510 may be a combination of fixed and/or removable storage devices, such as fixed disc drives, removable memory cards or optical storage, network attached storage (NAS), or a storage area-network (SAN).

Storage 510 comprises knowledge graphs 518, calculations 520, explanations 522, and user data 524, which generally represent knowledge graphs 122, calculations 126, explanations 124, and user data 132 of FIG. 1.

Figure 5B:
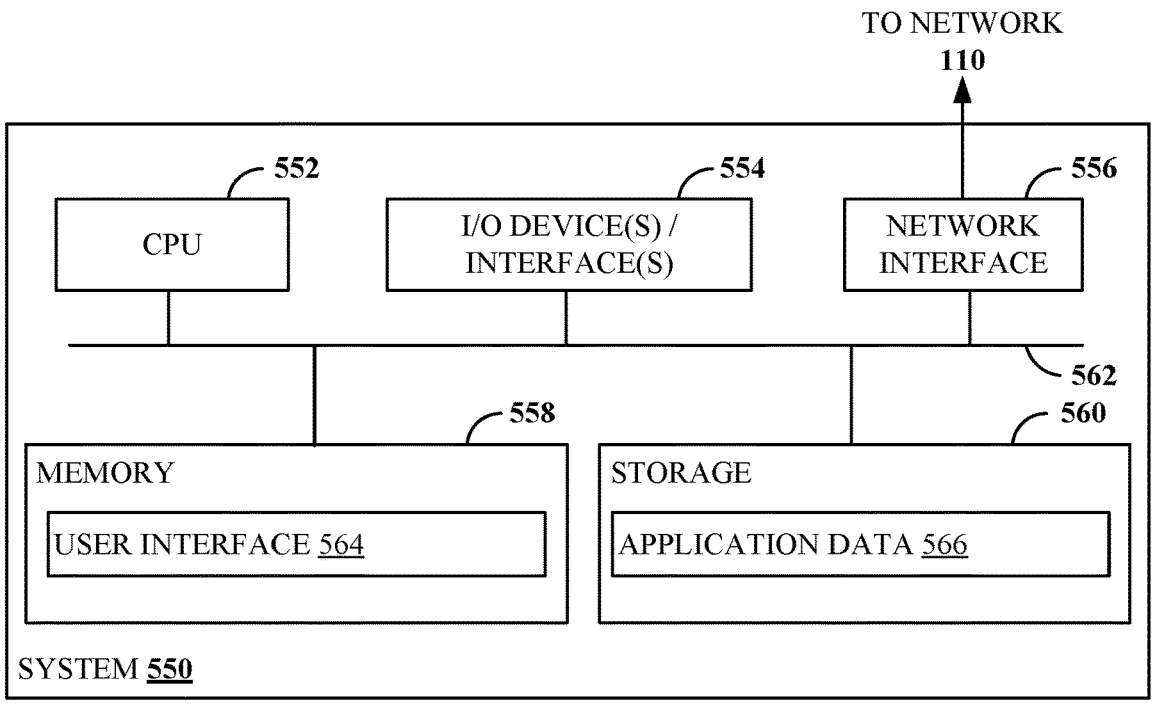

FIG. 5B illustrates another example system 550 with which embodiments of the present disclosure may be implemented. For example, system 550 may be representative of a client device on which user interface 110 of FIG. 1 runs.

System 550 includes a central processing unit (CPU) 552, one or more I/O device interfaces 554 that may allow for the connection of various I/O devices 554 (e.g., keyboards, displays, mouse devices, pen input, etc.) to the system 550, network interface 556, a memory 558, storage 560, and an interconnect 562. It is contemplated that one or more components of system 550 may be located remotely and accessed via a network. It is further contemplated that one or more components of system 550 may comprise physical components or virtualized components.

CPU 552 may retrieve and execute programming instructions stored in the memory 558. Similarly, the CPU 552 may retrieve and store application data residing in the memory 558. The interconnect 562 transmits programming instructions and application data, among the CPU 552, I/O device interface 554, network interface 556, memory 558, and storage 560. CPU 552 is included to be representative of a single CPU, multiple CPUs, a single CPU having multiple processing cores, and other arrangements.

Additionally, the memory 558 is included to be representative of a random access memory. As shown, memory 558 includes a user interface 564, which may be representative of user interface 110 of FIG. 1, and may be a client-side component corresponding to the server-side application 514 of FIG. 5A. In alternative embodiments, user interface 564 corresponds to a standalone application that runs on system 550 and performs operations related to explainable rule-based calculations as described herein.

Storage 560 may be a disk drive, solid state drive, or a collection of storage devices distributed across multiple storage systems. Although shown as a single unit, the storage 510 may be a combination of fixed and/or removable storage devices, such as fixed disc drives, removable memory cards or optical storage, network attached storage (NAS), or a storage area-network (SAN). Storage 560 comprises application data 566, which generally includes data related to the application to which user interface 564 corresponds. In an example, application data 566 may include user data, calculations, explanations, and the like.

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
 receiving a request from a client for a rule-based calculation;
 receiving one or more user values related to the request;
 using a calculation graph to determine the rule-based calculation based on the one or more user values, wherein the calculation graph comprises a plurality of nodes including at least one node that performs an operation using the one or more user values, and wherein the rule-based calculation is determined by performing the operation based on the at least one node;

selecting, from a plurality of explanation templates, an explanation template associated with the at least one node, wherein the explanation template includes one or more variables that correspond to the one or more user values, and wherein other explanation templates of the plurality of explanation templates are associated with other nodes of the plurality of nodes in the calculation graph;

generating an explanation of the rule-based calculation by populating the one or more variables in the explanation template based on the one or more user values;

providing, in response to the request, the rule-based calculation to the client for display via a user interface;

receiving, from the client, user input requesting the explanation of the rule-based calculation; and providing, in response to the user input, the explanation of the rule-based calculation to the client for display via the user interface.

2. The method of claim 1, wherein the user input is received after the rule-based calculation is displayed via the user interface.

3. The method of claim 1, wherein the user input is based on one or more of:
a user preference; or
a selection of a user interface element.

4. The method of claim 1, wherein using the calculation graph to determine the rule-based calculation based on the one or more user values comprises:
using a data model to determine one or more inputs to the at least one node, wherein the one or more inputs correspond to the one or more user values; and
using the data model to retrieve a constant associated with the calculation graph for use in performing the operation.

5. The method of claim 1, wherein the at least one node is a subset of the plurality of nodes in the calculation graph, and wherein the explanation of the rule-based calculation is generated based on which nodes are included in the subset.

6. The method of claim 1, wherein the rule-based calculation and the explanation of the rule-based calculation are configured to be displayed together within a page of the user interface.

7. The method of claim 1, wherein the explanation template comprises static language describing the operation performed by the at least one node.

8. A system, comprising one or more processors and a non-transitory computer-readable medium comprising instructions that, when executed by the one or more processors, cause the system to:
receive a request from a client for a rule-based calculation;
receive one or more user values related to the request;
use a calculation graph to determine the rule-based calculation based on the one or more user values, wherein the calculation graph comprises a plurality of nodes including at least one node that performs an operation using the one or more user values, and wherein the rule-based calculation is determined by performing the operation based on the at least one node;
select, from a plurality of explanation templates, an explanation template associated with the at least one node, wherein the explanation template includes one or more variables that correspond to the one or more user values, and wherein other explanation templates of the plurality of explanation templates are associated with other nodes of the plurality of nodes in the calculation graph;
generate an explanation of the rule-based calculation by populating the one or more variables in the explanation template based on the one or more user values;
provide, in response to the request, the rule-based calculation to the client for display via a user interface;
receive, from the client, user input requesting the explanation of the rule-based calculation; and
provide, in response to the user input, the explanation of the rule-based calculation to the client for display via the user interface.

9. The system of claim 8, wherein the user input is received after the rule-based calculation is displayed via the user interface.

10. The system of claim 8, wherein the user input is based on one or more of:
a user preference; or
a selection of a user interface element.

11. The system of claim 8, wherein using the calculation graph to determine the rule-based calculation based on the one or more user values comprises:
using a data model to determine one or more inputs to the at least one node, wherein the one or more inputs correspond to the one or more user values; and
using the data model to retrieve a constant associated with the calculation graph for use in performing the operation.

12. The system of claim 8, wherein the at least one node is a subset of the plurality of nodes in the calculation graph, and wherein the explanation of the rule-based calculation is generated based on which nodes are included in the subset.

13. The system of claim 8, wherein the rule-based calculation and the explanation of the rule-based calculation are configured to be displayed together within a page of the user interface.

14. The system of claim 8, wherein the explanation template comprises static language describing the operation performed by the at least one node.

15. A non-transitory computer-readable medium comprising instructions that, when executed by one or more processors of a computing system, cause the computing system to:
receive a request from a client for a rule-based calculation;
receive one or more user values related to the request;
use a calculation graph to determine the rule-based calculation based on the one or more user values, wherein the calculation graph comprises a plurality of nodes including at least one node that performs an operation using the one or more user values, and wherein the rule-based calculation is determined by performing the operation based on the at least one node;
select, from a plurality of explanation templates, an explanation template associated with the at least one node, wherein the explanation template includes one or more variables that correspond to the one or more user values, and wherein other explanation templates of the plurality of explanation templates are associated with other nodes of the plurality of nodes in the calculation graph;
generate an explanation of the rule-based calculation by populating the one or more variables in the explanation template based on the one or more user values;
provide, in response to the request, the rule-based calculation to the client for display via a user interface;

receive, from the client, user input requesting the explanation of the rule-based calculation; and provide, in response to the user input, the explanation of the rule-based calculation to the client for display via the user interface.

16. The non-transitory computer-readable medium of claim 15, wherein the user input is received after the rule-based calculation is displayed via the user interface.

17. The non-transitory computer-readable medium of claim 16, wherein the user input is based on one or more of:
a user preference; or
a selection of a user interface element.

18. The non-transitory computer-readable medium of claim 15, wherein using the calculation graph to determine the rule-based calculation based on the one or more user values comprises:
using a data model to determine one or more inputs to the at least one node, wherein the one or more inputs correspond to the one or more user values; and
using the data model to retrieve a constant associated with the calculation graph for use in performing the operation.

19. The non-transitory computer-readable medium of claim 15, wherein the at least one node is a subset of the plurality of nodes in the calculation graph, and wherein the explanation of the rule-based calculation is generated based on which nodes are included in the subset.

20. The non-transitory computer-readable medium of claim 15, wherein the rule-based calculation and the explanation of the rule-based calculation are configured to be displayed together within a page of the user interface.

* * * * *